2,318,633

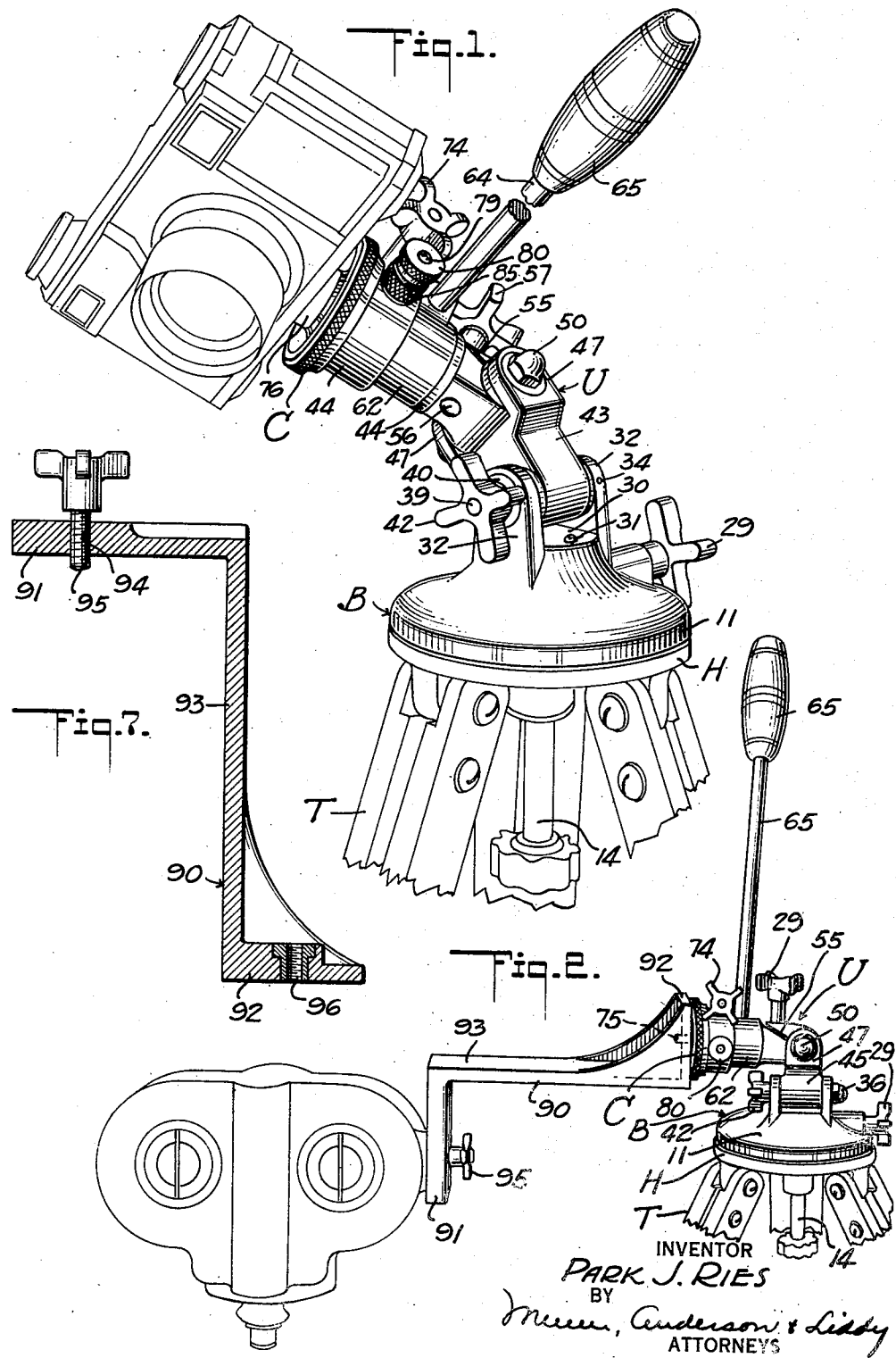
May 11, 1943.  P. J. RIES  2,318,633
INSTRUMENT MOUNTING DEVICE
Filed Aug. 13, 1940  2 Sheets-Sheet 1
INVENTOR
PARK J. RIES
BY
ATTORNEYS May 11, 1943.　　　　　P. J. RIES　　　　　2,318,633
INSTRUMENT MOUNTING DEVICE
Filed Aug. 13, 1940　　　　2 Sheets-Sheet 2
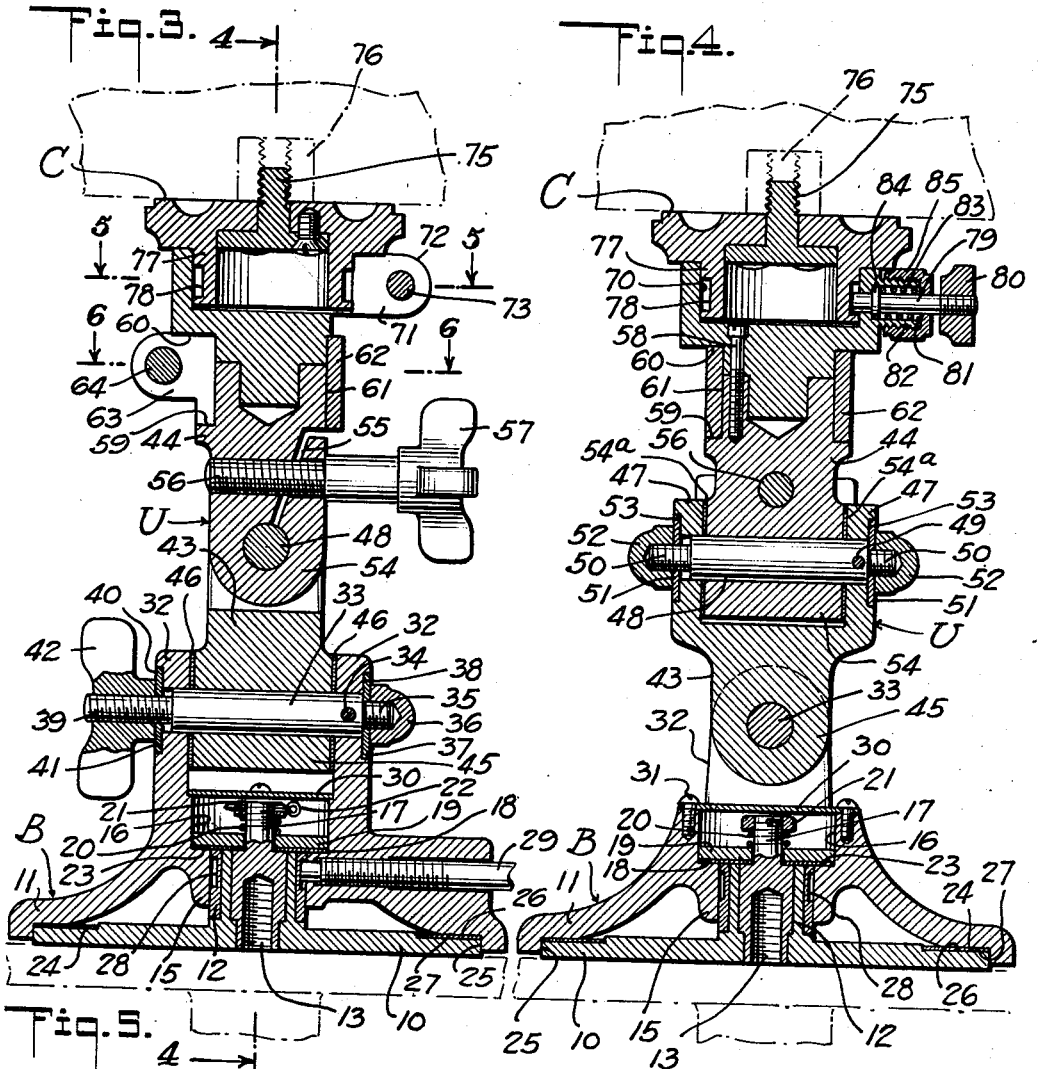
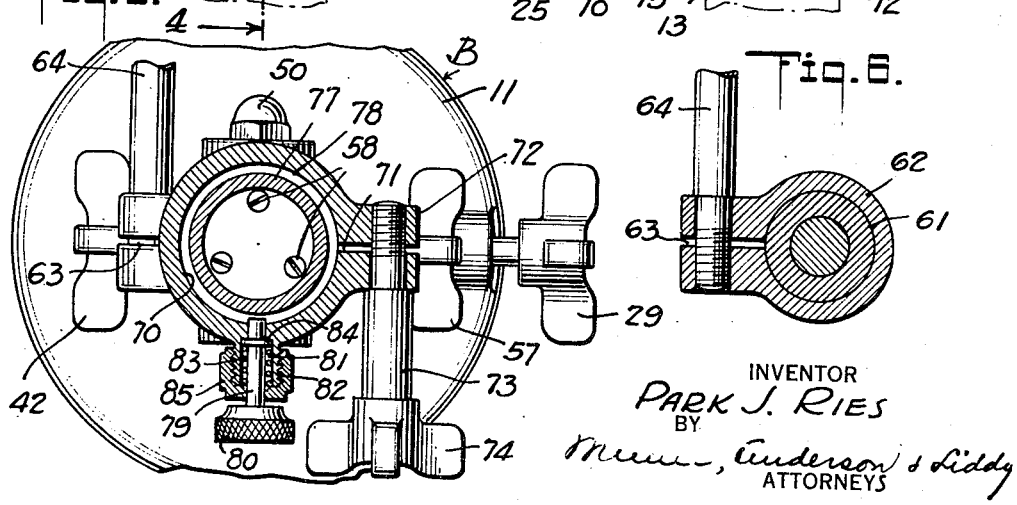
INVENTOR
PARK J. RIES
BY
Munn, Anderson & Liddy
ATTORNEYS Patented May 11, 1943

UNITED STATES PATENT OFFICE 2,318,633

INSTRUMENT MOUNTING DEVICE

Park J. Ries, Los Angeles, Calif.

Application August 13, 1940, Serial No. 352,369

9 Claims. (Cl. 248—183)

This invention relates generally to instruments, and more particularly to supports such as tripods for photographic apparatus and other instruments.

An object of this invention is to provide a device particularly adapted, although not necessarily for use in conjunction with a tripod, and structurally characterized by means enabling photographic apparatus such as a camera to be adjustably supported on a tripod in any position for the taking of photographs at and and all angles and in any and all directions, all with the camera held absolutely stable on the tripod and rigidly secured against displacement, whereby to greatly facilitate the use of the camera in the making of angle shots of every description, either for "stills" or motion pictures.

Another object of the invention is to provide a device of the above described character by which "panning" motion of the camera can be effected with the camera rigidly supported in a level position or in any desired tilted position.

A further object of the invention is to provide an instrument mounting device embodying an attachment by which a camera can be supported in a position overhanging the edge of a building, cliff or other elevated support, to obviate the necessity for the photographer to take risks in setting up the camera in such locations.

A still further object of the invention is to provide a device for adjustably mounting an instrument on a tripod and embodying a connector by which the instrument can be instantly attached to and detached from the device, as well as be rotatably mounted on the device against inadvertent or accidental disconnection from the device, and to be securely locked in any rotatively adjusted position on the device.

With these and other objects in view, the invention resides in the combinations and arrangements of elements as set forth in the following specification and particularly pointed out in the appended claims.

In the accompanying drawings,

Figure 1 is a perspective view showing the invention applied to a tripod, and adjustably mounting a camera thereon;

Figure 2 is a perspective view of the invention in use and showing the attachment for supporting a camera in overhanging positions, applied to the tripod and camera;

Figure 3 is a vertical central sectional view of the camera mounting device;

Figures 4, 5 and 6 are sectional views taken, respectively, on the line 4—4, 5—5 and 6—6 of Figure 3;

Figure 7 is a sectional view of the attachment shown applied in Figure 2.

Referring specifically to the drawings, the invention, in its present embodiment, comprises a base member B composed of a fixed section 10 and a rotatably mounted section 11 thereon. The fixed section 10 is in the form of a flat, circular plate having a central post 12 provided with a threaded bore 13 opening to the bottom of the plate to receive the usual connecting screw 14 carried by a tripod T to detachably secure the plate to the head H of the tripod.

The rotatable section 11 is a generally circular body having a central hub 15 journaled on the post 12, and provided with a co-axial circular socket 16 into which centrally projects a threaded shank 17 on the upper end of the post 12. The shank 17 receives a fibre washer 18, a metal washer 19, a coil spring 20 and a nut 21 which latter can be locked to the shank in various rotatably adjusted positions by a suitable cotter pin 22. With the spring 20 confined under compression, the washer 18 is yieldingly maintained in frictional contact with a transverse annular shoulder 23 on the section 11, and the latter in frictional contact with a fibre ring 24 seating in a circular recess 25 in the section 11 so as to be interposed between transverse annular surfaces 26 and 27 on the sections 10 and 11, respectively.

The section 11 is thus rotatably mounted on the section 10 with wear between the sections automatically compensated for to insure that no looseness which might adversely affect the use of a camera can develop.

The post 12 is provided with a peripheral annular groove 28 adapted to receive the inner end of a locking screw 29 threaded into the section 11 so as to lock the latter against rotation relative to the section 10. A cover plate 30 is secured by screws 31 to the member 11 to close the open end of the socket 16 to conceal the parts therein.

Rising from the member 11 are two spaced ears 32 through registering openings of which extends a pivot pin 33 locked to one ear against rotation by a diametric pin 34 and having a threaded shank 35 at one end receiving a cap nut 36 and a bearing washer 37 flush seated in a recess 38 in said one ear. The other end of the pin is also provided with a threaded shank 39 receiving a bearing washer 40 flush seated in a recess 41 in the other ear 32, and a cross handle nut 42.

Mounted on the pin 33 is a universal joint designated generally at U and composed of two joint elements 43 and 44, the former of which is provided at one end with a sleeve 45 freely receiving the pin 33 and adapted to be clamped between the ears 32 and fibre washers 46 on the pin, upon tightening the nut 42 so as to lock the joint element 43 against adjustment about the axis of the pin.

The other end of the joint element 43 is bifurcated to provide spaced ears 47 having registering openings through which extends a pivot pin 48 in right angular relationship to the pin 33. The pin 48 is locked to one ear 47 by a diametric pin 49, and has threaded shanks 50 at its ends receiving bearing washers 51 and cap nuts 52, the washers being flush seated in recesses 53 in the ears.

The joint element 44 is provided at one end with a sleeve 54 receiving the pin 48 and is slotted radially as indicated by 55 to enable the element 44 to be clamped to the pin 48 by a clamp screw 56 threaded into the element 44 to extend across the slot 55, and provided with a cross handle 57. The nuts 52 are tightened sufficiently for the ears 47 to clamp the sleeve 54 against interposed fibre washers 54a on the pin 48 to maintain the element 44 in any position to which it is adjusted.

The joint element 44 is constructed in two sections secured together by screws 58 and providing spaced and confronting transverse annular shoulders 59 and 60 and a cylindrical portion 61 therebetween on which is rotatably mounted a hub 62 having a radial slot 63 across which extends the threaded end of an arm 64 provided with a handle 65 and threaded into the hub so as to enable the hub to clamp or release the portion 61 according as the handle is turned in one direction or the other.

The upper and enlarged end of the element 44 is provided with a circular socket 70 and is slotted radially at 71 from the socket through ears 72 into one of which is threaded a clamp screw 73 having a cross handle 74.

A connector designated generally at C is provided with a threaded stud 75 adapted to be screwed into the usual nut 76 (Figures 3 and 4) fixed in the bodies of cameras and normally co-acting with the tripod screw 14 to secure the camera on the head of the tripod. By this means the connector C can be detachably secured to any desired camera.

The connector C is provided with a reduced cylindrical portion 77 rotatably received in the socket 70 and provided with a peripheral annular groove 78. A latching pin 79 provided with a knob 80 is mounted in the radial bore 81 of a tubular projection 82 on the element 44 opposite the socket 70. A coil spring 83 surrounds the pin 79, and at one end abuts a shoulder 84 on the pin. At its other end the spring 83 abuts a cup-shaped cap 85 threaded on the projection 82 for co-action in urging the pin to the latching position shown in Figures 4 and 5 wherein the inner end of the pin projects into the groove 78 to prevent axial displacement of the connector from the element 44 yet permit rotation of the element relative to the connector. However, upon tightening the screw 73 the wall of the socket 70 will be constricted to grip the portion 77 of the connector C and thus lock the connector to the element against rotation relatively thereto. By means of the latching pin 79, the connector can be instantly attached and detached as a unit with the camera from the mounting device in its installed position on a tripod, and can either be secured against rotation by the screw 73 or left free for rotation without danger of becoming separated from the device.

In operation, and with the mounting device applied to a tripod and supporting an instrument such as a camera as shown in Figure 1, it will be clear that by suitable relative adjustment of the elements 43 and 44 of the universal joint U about the axis of the pin 48, and adjustment of the section 43 about the axis of the pin 33, the camera can be tilted to and maintained at any angle relative to the tripod, and with the legs of the latter disposed to obtain maximum stability.

With the screw 29 loosened and the hub 62 locked to the element 44 in any desired rotatively adjusted position, the mounting device can be conveniently rotated by the handle 65 as a unit about the axis of the post 12. Also with the screw 73 loosened, the camera and connector C can be rotated as a unit about the axis of the cylindrical portion 61 of the element 44.

Thus it will be manifest that the camera can be instantly adjusted to and locked in any position on the tripod for any and all shots in any and all directions, all without disturbing the tripod once the latter is mounted in a stable position. Furthermore, by the provision of the connector C and its associated latching means, a camera can be instantly attached to and detached from the mounting device, and will be positively latched in its attached position against accidental displacement.

In Figures 2 and 7, an attachment is shown and is in the form of a bracket 90 generally Z-shaped in outline to provide oppositely projecting attaching portions 91 and 92 at opposite ends of an intermediate portion 93. The portion 91 is provided with a threaded bore 94 adapted to receive a clamp screw 95, and the portion 92 is provided with a nut 96 similar to the camera carried nut 76 and adapted to receive the stud 75 (Figure 2) to secure the bracket to the mounting device. The clamp screw 95 is utilized to secure a camera to the bracket as shown in Figure 2, so that by appropriate adjustment of the mounting device an overhanging position of the camera with respect to the roof of a building or other elevated position can be obtained in safety. The bracket enables other useful positions of motion picture cameras to be obtained in practising trick photography.

What is claimed is:

1. An instrument mounting device comprising: a base member adapted to be secured to a support and including a rotatably mounted portion; means for securing said portion against rotation; a connector adapted to be secured to an instrument; a universal joint composed of two pivotally connected elements one of which is pivotally mounted on said portion of the base member; means for detachably securing said connector to the other of said elements for rotation relative thereto; means for locking said connector against rotation relative to said other element; a split hub rotatably mounted on said other element; and a handle arm threaded into said hub by which the latter can be constricted to grip said other element in various circumferentially adjusted positions of said arm.

2. An instrument mounting device comprising: a base member adapted to be secured to a support; a connector having an annularly grooved peripheral portion and adapted to be secured to an instrument; means mounting said connector on the base member and including a socket in which said peripheral portion of the connector can be rotatably mounted; a spring-pressed latching pin carried by said mounting means and urged into said annular groove for co-action therewith in confining the connector against axial displacement from the socket while leaving the connector free for rotation in the socket; and means by which the connector can be secured in the socket against rotation.

3. An instrument mounting device comprising: a base member adapted to be secured to a support; a connector having an annularly grooved peripheral portion and adapted to be secured to an instrument; means mounting said connector on the base member and including a slotted socket in which said peripheral portion of the connector can be rotatably mounted; a spring-urged latching pin carried by said mounting means and co-acting with said annular groove to confine the connector against axial displacement from the socket while leaving the connector free for rotation; and a clamp screw threaded into said mounting means across said slot thereof for constricting the socket to clamp the connector against rotation.

4. An instrument mounting device comprising: a base member adapted to be secured to a support and including a rotatably mounted portion; means for securing said portion against rotation; a connector adapted to be secured to an instrument; a universal joint composed of two pivotally connected elements one of which is pivotally mounted on said portion of the base member; the other of said elements having a socket and said connector having a peripheral portion rotatable in the socket; means for confining the connector against axial displacement from the socket while leaving the connector free for rotation: means for securing the connector against rotation; a handle member rotatably mounted on said other element for adjustment to occupy working and non-obstructing positions with respect to an instrument attached to said connector; and means for locking said handle member to said other element.

5. An instrument mounting device comprising: a base member adapted to be secured to a support and including a rotatably mounted portion; means for securing said portion against rotation; a connector adapted to be secured to an instrument; a universal joint composed of two pivotally connected elements one of which is pivotally mounted on said portion of the base member; the other of said elements having a constrictable socket and said connector having an annularly grooved peripheral portion rotatable in the socket; a spring-urged pin carried by said other element and co-acting with said annular groove to confine the connector against axial displacement from the socket while leaving the connector free for rotation; a clamp screw threaded into said other element for constricting the socket to clamp the connector against rotation; a constrictable hub rotatably mounted on said other element; and a handle arm threaded into said hub for constricting the latter to clamp the hub to said other element.

6. An instrument mounting device comprising: a base member composed of two sections one of which is adapted to be secured to a support and is provided with a post; the other section having a hub receiving the post and a recess rotatably receiving a portion of said one of the sections for co-action therewith in providing annular bearing shoulders between the sections; means yieldingly securing the sections together and maintaining said bearing shoulders in frictional contact for relative rotation of the sections; means for securing the sections against relative rotation; a connector adapted to be secured to an instrument; means mounting said connector on said other section of the base member for adjustment to occupy various tilted positions and including a socket in which said connector can be rotatably mounted; means for confining the connector against axial displacement from the socket while leaving the connector free for rotation in the socket; and means by which the connector can be secured in the socket against rotation.

7. An instrument mounting device comprising: a base member composed of two sections one of which is adapted to be secured to a support and is provided with a post; the other section having a hub receiving the post and a recess rotatably receiving a portion of said one of the sections for co-action therewith in providing annular bearing shoulders between the sections; means yieldingly securing the sections together and maintaining said bearing shoulders in frictional contact for relative rotation of the sections; means for securing the sections against relative rotation; a connector adapted to be secured to an instrument; a universal joint composed of two pivotally connected elements one of which is pivotally mounted on said other section of the base member; means for detachably securing said connector to the other of said elements for rotation relative thereto; means for locking said connector against rotation relative to said other element; a handle member rotatably mounted on said other element, for adjustment to occupy working and non-obstructing positions with respect to an instrument attached to said connector; and means for locking said handle member to said other element.

8. In an instrument mounting device, two pivotally connected elements, one of which is adapted to mount an instrument; means by which the other of said elements is adapted to be rotatably mounted on a support for panoramic movements, with said one of the elements operable for tilting movements; a handle member; means by which said member is rotatably mounted on said one of the elements to occupy a working position for panoramic and/or tilting adjustment of the elements by the handle, and a non-obstructing position for sighting and/or focusing operations; and means co-actable with said one of the elements and said member, by which the latter can be locked to said one of the elements in any selected position of rotational adjustment.

9. In an instrument mounting device, two pivotally connected elements, one of which is adapted to mount an instrument; means by which the other of said elements is adapted to be rotatably mounted on a support for panoramic movement, with said one of the elements operable for tilting movements; said one of the elements having a peripheral portion; a handle member having a split hub rotatably mounted on said peripheral portion for adjustment of the handle member to occupy working and non-obstructing positions; and means by which the handle member can be actuated to constrict the hub and lock the handle member in a selected position of adjustment.

PARK J. RIES.